United States Patent [19]

Hashimoto et al.

[11] 4,352,167
[45] Sep. 28, 1982

[54] METHOD OF LOCATING SOUND GENERATION WITHIN ENCLOSURE

[75] Inventors: Yuuji Hashimoto, Hiroshima; Izumi Kobayashi, Higashikurume; Mitsuo Suzuki, Yokohama; Kimio Yamada, Hitachi; Shigeru Izumi, Tokyo; Yoshihiro Michiguchi, Ibaraki, all of Japan

[73] Assignees: The Chubu Electric Power Co., Inc.; The Chugoku Electric Power Co., Inc.; The Tokyo Electric Power Co., Inc.; Hitachi, Ltd., all of Tokyo, Japan

[21] Appl. No.: 129,559

[22] Filed: Mar. 12, 1980

[30] Foreign Application Priority Data

Sep. 14, 1979 [JP] Japan .................................. 54-118306

[51] Int. Cl.³ .............................................. G01S 5/18
[52] U.S. Cl. .................................. 367/127; 343/112 C
[58] Field of Search ............... 367/127, 129, 124, 126; 343/112 C; 364/517, 581, 753, 812, 813

[56] References Cited

U.S. PATENT DOCUMENTS

| | | | |
|---|---|---|---|
| 2,368,953 | 2/1945 | Walsh | 367/126 X |
| 3,886,553 | 5/1975 | Bates | 367/127 X |
| 4,031,501 | 6/1977 | Caruso | 367/127 X |

*Primary Examiner*—Richard A. Farley
*Attorney, Agent, or Firm*—Antonelli, Terry & Wands

[57] ABSTRACT

A number of sound detectors are provided on an external enclosure of a pressure vessel of a nuclear reactor. Output signals produced from the individual detectors are combined into a pattern in terms of time difference of the detector output signals relative to the time point at which the detected signal is first produced in response to the sound signal and relative peak values of the detector output signals relative to the magnitude of the output signal produced by the detector which detects the sound signal with the highest sensitivity. The pattern thus obtained is then compared with patterns which have been previously prepared by intentionally producing the sound signals at locations in interest within the pressure vessel, to thereby estimate the location within the pressure vessel at which the sound is produced.

15 Claims, 6 Drawing Figures

METHOD OF LOCATING SOUND GENERATION WITHIN ENCLOSURE

BACKGROUND OF THE INVENTION

1. Field of the Invention

The present invention relates in general to a method of and a system for detecting a location within an enclosed vessel at which a sound signal is produced. The method according to the invention is particularly suited for locating an inner portion of a pressure vessel of a nuclear reactor at which a sound is produced due to collision of a loose part against that portion.

2. Description of the Prior Art

Collision of a so-called loose part such as an accidentally introduced metal part or a part detached from an inner structure with inner parts of a pressure vessel of a nuclear reactor is not only a transient phenomenon the occurrence of which can not be predicted but also a transitory phenomenon in the sense that it may not take place again once it has occurred. It is important for the safety operation of a nuclear plant to catch the transient and transitory phenomenon and detect with a high reliability when it takes place due to the collision of loose parts. In the case of a nuclear reactor in operation, there are present background noises such as electric noises and notch noise produced upon driving the control rods. Thus the sound produced as a result of collision of a loose part with the vessel has to be discriminated from these background noises. In this connection, it is noted that the notch noise produced upon driving the control rod, for example, inherently has a high similarity to the sound produced by a loose part, making it difficult to discriminate the latter from the former.

Heretofore, as an approach for detecting the sound produced by a loose part, a filter and a peak value discriminator have been used, wherein the appearance of a signal level higher than a preset value is evaluated as an indication of the sound produced by the loose part. Of course, it is impossible with this approach to discriminate the sound due to collision of the loose part from the background noises described above. As another attempt, it has been proposed to estimate the location of a collision on the basis of the difference in time in the appearance of output signals from the sound detectors, wherein a signal having a particular time difference is utilized as the signal indicating the abnormal sound. This method is certainly effective for the objects such as conduits and a container of a simple structure which can be dealt with one- or two-dimensionally. However, it is impossible to estimate with a reasonable accuracy the location at which the sound due to collision is produced in a complicated container such as a pressure vessel of a nuclear reactor because of an increased number of much complicated sound propagation paths.

SUMMARY OF THE INVENTION

An object of the invention is to provide a method of determining a location at which a sound is produced within a container of a complicated inner structure with a high accuracy.

In view of the above and other objects which will become more apparent as description proceeds, it is proposed according to an aspect of the invention that a plurality of sound detectors are disposed with an appropriate distance therebetween on an outer surface of a vessel with a distribution to cover all locations where a sound signal to be detected may possibly be produced. The output sound signals from the individual sound detectors are combined into a pattern in terms of the difference in time among the detected signals and the relative values of peak levels of the detected signals. The pattern thus obtained is then compared with patterns which have been prepared previously by producing intentionally the sounds at the locations in interest, thereby to estimate the location at which the sound is really generated.

DETAILED DESCRIPTION OF THE PREFERRED EMBODIMENTS

Figure 1:
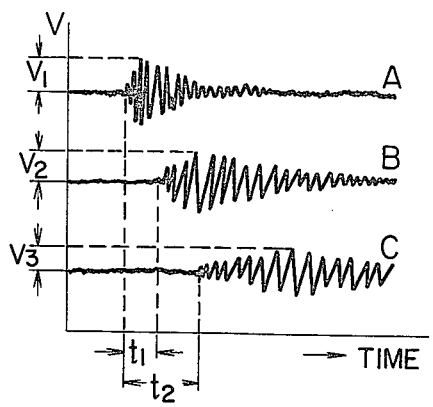
FIG. 1 shows graphically exemplary waveforms of signals output from various sound detectors to illustrate the principle of the invention.

Since a sound signal produced upon collision of a loose part with some portion of a pressure vessel is a transient and transitory phenomenon, it is extremely difficult, if not impossible, to detect and locate the generation of the sound signal through statistical procedures. Consequently, in order to obtain as much information as possible, it will be effective to use a plurality of sound signal detectors (hereinafter also referred to simply as a detector). Although the detector used to this end may be of any convenient type, the detector of a type adapted to respond to an acceleration component of the sound signal is preferred because the sound signal can be caught with a higher sensitivity. By way of example, FIG. 1 illustrates graphically signal waveforms produced at a single location within a pressure vessel of a nuclear reactor and detected by the detectors A, B and C disposed at different positions within the vessel. As is shown in FIG. 1 at A, B and C, the waveforms detected by the individual detectors differ from one another in respect of the peak value and the arrival time, i.e. time required for the sound wave produced at the single location to reach the respective detectors. Since the arrival time is porportional to the length of sound propagation path extending between the sound source (i.e. location at which the sound is produced) and the detectors, the difference in the arrival time $t_1$ between the detectors A and B as well as the arrival time difference $t_2$ between the detectors A and C constitute indexes for determining or locating the sound source. When the sound is directly transmitted to the detectors, it is possible to arithmetically determine the position of the sound source on the basis of the output signals from the detectors. However, in the case of a complicated structure such as the pressure vessel of a nuclear reactor, sound propagation becomes correspondingly indefinite, thereby making it impossible to determine the position of the sound source through calculation. This is because the arrival time differences described above will not provide definite indexes for locating the sound source due to complicated paths of sound propagation. According to the teaching of the present invention, it is proposed to utilize, in addition to the arrival time differences, the peak values $V_1$, $V_2$ and $V_3$ which contains information about the respective propagation paths or routes. More specifically, the peak values differ from one another in dependence on the configurations or geometrical forms of the structures along and/or through which the sound wave is transmitted, even when the arrival time differences are equal to each other between the individual detectors. In this way, combinations of the arrival time differences and the relative peak values of the sound wave as detected by a number of the detectors will indicate invariably one and the same sound source and become correspondingly different for different sound sources. A method based on the above principle will be described below.

Figure 2:
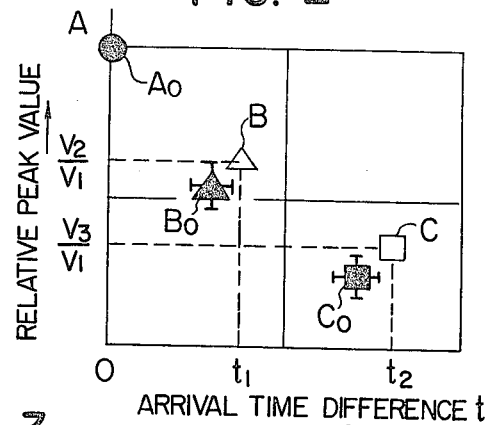
FIG. 2 illustrates graphically a concept for discriminating patterns according to the teaching of the invention.

Referring to FIG. 2, the arrival time difference t is taken along the abscissa, while the relative peak value is scaled along the ordinate. Reference characters A, B and C denote the detectors which have detected the signal waves illustrated in FIG. 1, which are shown at the corresponding coordinates. Because the detector output signals exhibit definite arrival time differences and peak values for a certain definite sound source within the pressure vessel, as described hereinbefore, a corresponding difinite distribution or pattern can be obtained on the coordinate of the arrival time difference and the peak value for the certain definite sound source. The reason why the relative peak values $V_2/V_1$ and $V_3/V_1$ are made use of is to remove the non-uniformity in the patterns which might otherwise be brought about due to different intensities of collisions or striking shocks. For estimation of the source location of a produced sound, one hundred patterns which may be obtained by striking about ten times a concerned pressure vessel at each of one hundred different locations thereof are previously prepared and stored together with standardized deviations in a suitable manner and read out for comparing with an unknown pattern as produced subsequently, thereby to estimate the location of the sound source corresponding to the unknown pattern. Solid black symbols $A_0$, $B_0$ and $C_0$ shown in FIG. 2 show patterns previously stored for predetermined sound sources. Horizontal and vertical bars extending from the patterns $B_0$ and $C_0$ represent ranges of errors. The accuracy at which locations of the sound sources can be estimated can be improved to the degree of the standard deviation by increasing the number of the patterns to be referred to.

In particular, when the detected sound signals from the three detectors A, B and C exhibit the arrival time differences $t_1$ and $t_2$ and have the relative peak values $V_2/V_1$ and $V_3/V_1$, as is illustrated in FIG. 1, the corresponding pattern will then be such as the one shown in FIG. 2 at A, B and C. When this pattern coincides to a most satisfactory degree with a certain reference pattern of $A_0$, $B_0$ and $C_0$ which has been previously taken for a sound signal produced at a predetermined point within the vessel, then it is estimated that the point at which the sound signal of the pattern of A, B and C is produced will lie at least in the vicinity of the predetermined point at which the reference sound signal of the pattern of $A_0$, $B_0$ and $C_0$ is produced.

The estimation described above allows the sound produced by a loose part to be discriminated from operation noises such as notch noise produced upon operation of the control rods. Further, any electrical noises may be easily discriminated on the basis of the fact that the time differences in the noise signals among the detector outputs are equal to zero.

Figure 3:
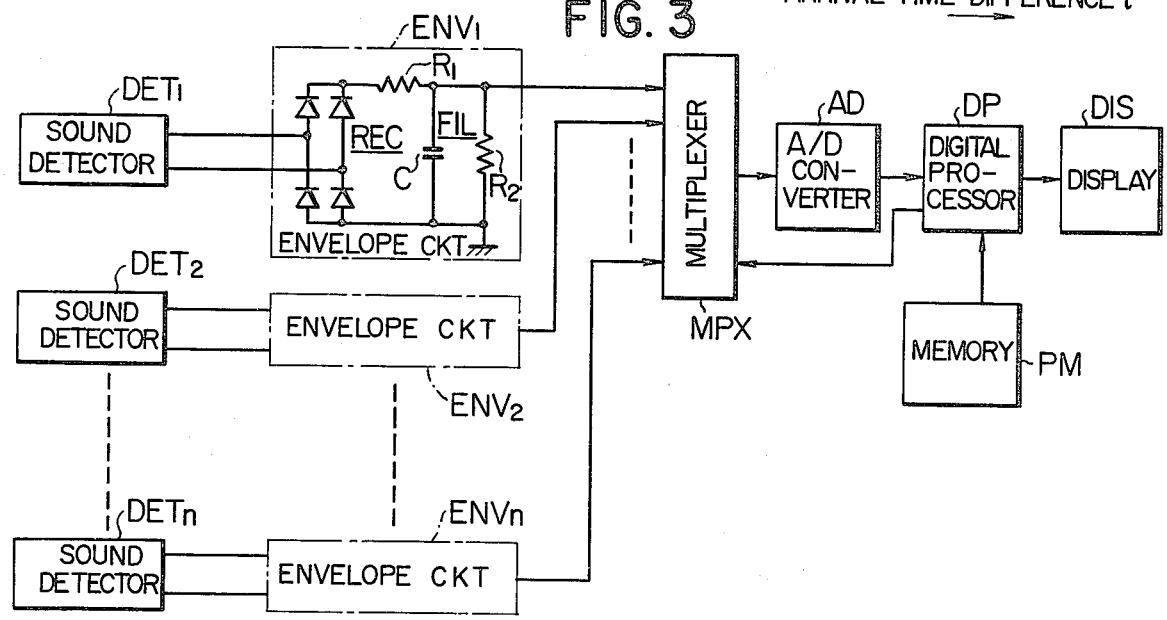
FIG. 3 shows in a block diagram a general arrangement of an apparatus suited for implementing the invention.

FIG. 3 shows in a block diagram an arrangement of a typical apparatus for implementing the teachings of the invention. In this figure, $DET_1$, $DET_2$, ..., $DET_n$ represent detectors mounted at an external surface of a pressure vessel wall at a predetermined inter-space. Reference characters $ENV_1$, $ENV_2$ ..., $ENV_n$ denote envelope circuits each of which may be constituted by a rectifier circuit REC and an integrating circuit FIL which exhibit different charge and discharge time constants ($R_1C < R_2C$) for every circuit ENV. A multiplexer MPX serves for sampling the output signals from the envelope circuits ENV at a predetermined period. The sampled signal output from the multiplexer MPX is converted into a corresponding digital signal by an analogue-to-digital or A-D converter AD which signal is then supplied to a digital signal processor circuit. The latter functions to process the digital signal output from the A-D converter in accordance with a predetermined program stored therein to thereby arithmetically determine the arrival time differences and the relative peak values among the signals appearing at the outputs of the individual detectors for preparing the corresponding detected patterns such as described hereinbefore in conjunction with FIG. 2. Additionally, the digital signal processor DP stores a program for allowing an arithmetic unit to discriminatively compare the detected patterns with the reference patterns previously prepared for the sound signals produced at predetermined locations within the vessel as well as the program for displaying the results of the comparison and/or the detected and the reference patterns on a display such as a CRT. Reference character PM denotes a memory in which there are stored the time differences and the relative peak values of the individual detectors obtained upon generation of the sound signal at the predetermined points within the pressure vessel. The display DIS serves to display the output signals from the digital signal processors DP on CRT, for example.

The circuit arrangement shown in FIG. 3 is so adapted as to estimate a location of a sound source by arithmetically determining the arrival time differences and the relative peak values among the detected signals output from the individual detectors through pattern comparison, as illustrated in FIG. 2. Next, description will be made on a concept how to detect the arrival time difference and the peak value on the basis of the output signals from the individual detectors by referring to FIG. 4.

Figure 4:
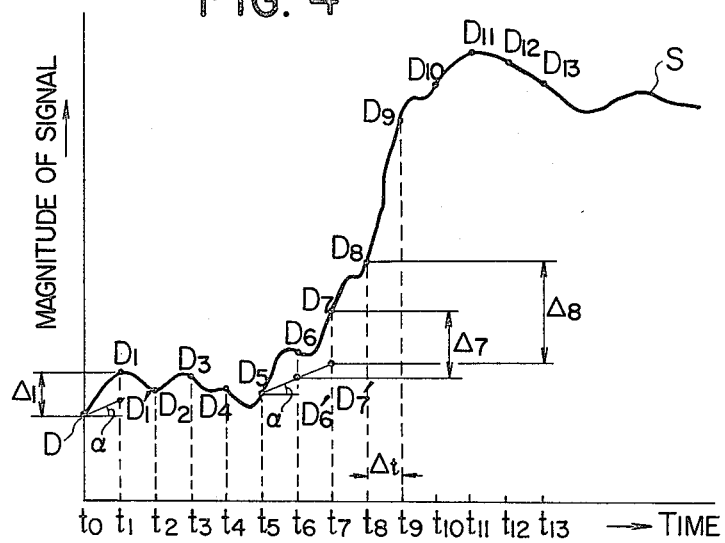
FIG. 4 is to graphically illustrate procedures for determining the rise time of an output signal and the peak values for carrying out conveniently a method according to the invention.

Referring to FIG. 4 in which time is taken along the abscissa with the magnitude of the detected signal being taken along the ordinate, a curve S represents a signal wave form converted from the output signals from the detectors DET through the envelope circuit, $t_0$, $t_1$, $t_2$ ... $t_n$ represent the sampling time points, and $D_0$, $D_1$, $D_2$ ... $D_n$ represent the values sampled at the respective sampling time points. The output signal from the detectors sampled at a predetermined periodic interval $\Delta t$ and digitized is processed together with the data representing the sampling time points through the digital signal processor DP in the following manner.

Assuming that the data processing is started at a time point $t_0$, data $D_0$ at that time as well as data representative of the time point $t_0$ are internally stored. At a time point $t_1$, data $D_1$ at that time and the stored data $D_0$ are compared with each other. Deviation $\Delta_1$ which is given by $(D_1-D_0)$ will be now considered. When $\alpha \cdot \Delta t \leq \Delta_1 \leq \beta$, where $\alpha$ represents a predetermined ratio of change or variation and $\beta$ represents a predetermined deviation, then data $D_1'$ ($D_1'=D_0+\alpha \cdot \Delta t$) is stored together with the data representative of the time point $t_0$ in the digital processor unit DP. On the other hand, when $\Delta_1 < \alpha \cdot \Delta t$, then the data $D_1$ and the data representative of the time point $t_1$ are stored in the processor DP in place of the data $D_0$ and the time data $t_0$, respectively. In other words, when the deviation between the data compared at every sampling time point is smaller than $\alpha \cdot \Delta t$, the amplitude data as well as the time data will follow up the fresh input data. On the other hand, when the deviation is in the range of $\alpha \cdot \Delta t$ to $\beta$, inclusive, the corrected data for signal magnitude is stored while the time data remains unaltered.

Figure 5:
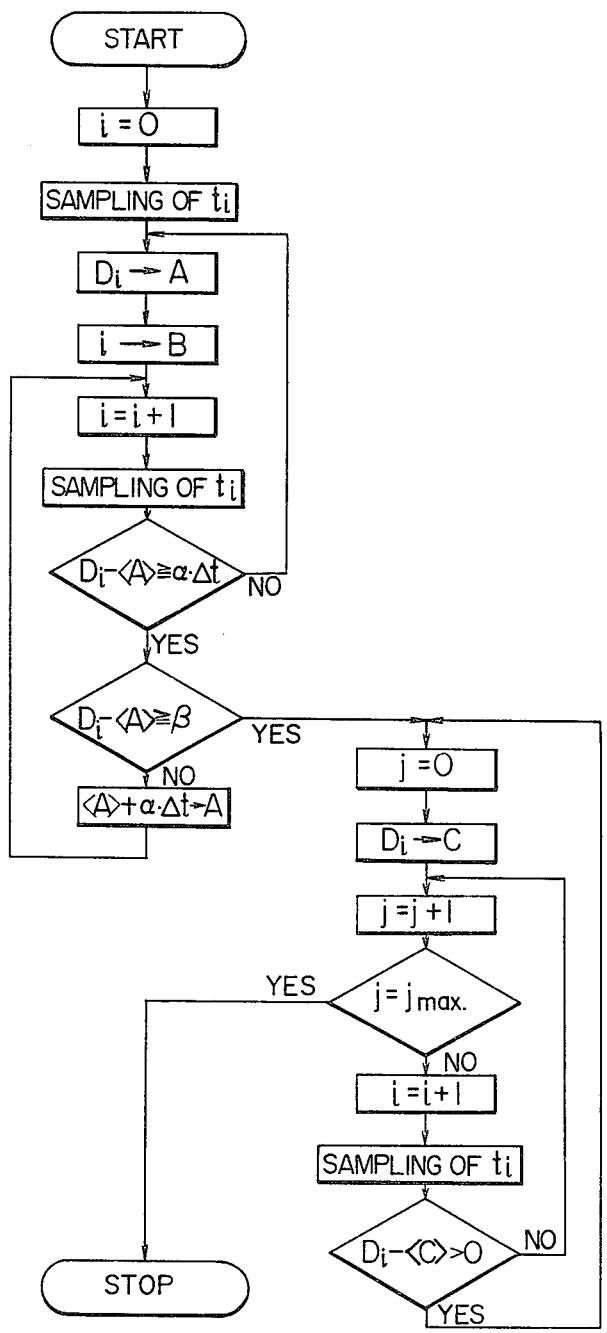
FIG. 5 is a flow chart to illustrate the procedure for determining the rise time and the peak value of a sound signal.

Next, considering a significant change in the data representing the signal magnitude as at the sampling time point $t_5$, $t_6$ and $t_7$, the deviations $\Delta_6$ ($=D_6-D_5$) and $\Delta_7$ ($=D_7-D_6'$) are greater than $\alpha \cdot \Delta t$ but smaller than $\beta$. Accordingly, only the data representative of the signal magnitudes are up-dated to $D_6'$ and $D_7'$, while the data representative of the sampling time point $t_5$ is held unaltered. At the sampling time point $t_8$, the deviation $\Delta_8$ ($=D_8-D_7'$) will exceed $\beta$. Then, the digital processor unit DP determines that an output signal makes an appearance at one of the detectors, whereby the data representative of the sampling point $t_5$ and held in the processor DP is regarded as the data representing the time point at which the sound signal has reached the one detector. The processing for the output signal from the detector which has been identified as the one detecting the effective output signal is transferred to the detection of the peak value. To this end, data representing the time point ($D_8$ in the case of the illustrated example) at which the signal magnitude data exceeds $\beta$ is stored in the digital processor DP. The stored data value is subsequently compared with the next sample value. When the value stored in the digital processor DP is smaller than the instant sample value, the former is up-dated to the latter. On the contrary, when the stored sample value is greater than the instant sample value, the former is held without being up-dated. By continuing the processing described above for a predetermined time, a maximum value (i.e. the peak value) appearing during a period from the time point at which $\beta$ is exceeded to the time point at which the processing is stopped will be stored in the digital processor DP. FIG. 5 shows in a flow chart the procedure for determining or detecting the rise time and the peak value described above. In the flow chart A, B and C denote resisters, <A>, <C> contents of registers A and C respectively, $D_i$ i-th sampled value, and $\alpha,\beta$ positive constants. In this connection, it will be noted that a microcomputer may be employed as the digital processor. In such case, when the sampling interval is too short for the processing to follow up, the sound output signals from the individual detectors may be previously stored in a memory or storage device and similar processing may be executed later on.

The similar processings and determinations are executed for the output signals of all the detectors within the sampling interval $\Delta t$. When the processing for the signal magnitude data has been completed starting from the time point at which the decision is made to the effect that the output signal makes an appearance at one of the detectors and ending at the time point at which the output signals from the other detectors are expected to be produced, the pattern decision is made to compare the data with the reference pattern in a manner described below.

For locating the sound source by selecting the reference patterns similar to the unknown pattern as detected, a weighted least square method may be adopted, for example. Usable evaluation equation is given as follows:

$$A = \left[ \left(\frac{\Delta Y_1}{\sigma y_1}\right)^2 + \cdots + \left(\frac{\Delta Y_N}{\sigma y_N}\right)^2 + \left(\frac{\Delta X_1}{\sigma x_1}\right)^2 + \cdots + \left(\frac{\Delta X_N}{\sigma x_N}\right)^2 \right]^{\frac{1}{2}} /2N \quad (1)$$

where $\Delta Y_i$: difference between the reference pattern and the unknown pattern for the i-th detector, $\Delta X_i$: difference in the time difference between the reference pattern and the unknown pattern for the i-th detector, $\rho y_i$: standard deviation of the relative peak value of the reference pattern for the i-th detector, $\rho x_i$: standard deviation of the time difference of the reference pattern for the i-th detector, and N: number of the detectors.

Now, comparing operations in accordance with the method of least squares will be described. In the first place, the relative peak values and the time differences for all the detectors are determined. In the case where N detectors are provided, the relative peak values and the time differences are obtained in number N, respectively. On the other hand, the reference data is previously prepared through various preliminary experiments. The reference data is grouped in a table for every point at which the sound signal is produced. Each of the table data contains the relative peak values, arrival time differences, standard deviations of the relative peak values and the standard deviations of the time differences for each of the detector. In other words, in the case where N detectors are provided, a reference pattern for each of the points at which the sound signals are produced is prepared with $4 \times N$ data. Accordingly, assuming that the number of the points at which the sound signals are produced is equal to M, the data table comprises M data groups each of which contains $4 \times N$ data.

Through sequential data retrieval from the table of the composition described above, all the data constituting a group is read out for every group. On the basis of the data thus obtained for every data group, N relative peak values and time differences previously determined in an arithmetic operation are executed in accordance with the equation (1). In other words, the differences $\Delta Y_i$ ($i=1, 2, \ldots, N$) between the peak values of the reference data and the actual peak values are determined, divided by the standard deviations $\rho_{yi}$ for each of the detectors and finally squared. This arithmetic operation is executed for all the detectors to determine a sum. The results correspond to the following terms of the equation (1):

$$\left(\frac{\Delta Y_1}{\sigma y_1}\right)^2 + \left(\frac{\Delta Y_2}{\sigma y_2}\right)^2 + \ldots \left(\frac{\Delta Y_N}{\sigma y_N}\right)^2 \quad (2)$$

Concurrently, similar arithmetic operation is effected for the time difference, the results of which correspond to the following terms of the equation (1):

$$\left(\frac{\Delta X_1}{\sigma x_1}\right)^2 + \left(\frac{\Delta X_2}{\sigma x_2}\right)^2 + \ldots + \left(\frac{\Delta X_N}{\sigma x_N}\right)^2 \quad (3)$$

The results given by the expressions (2) and (3) are added together, square root is extracted, and the result is divided by 2 N, whereby the arithmetic operation results expressed by the equation (1) can be obtained.

Figure 6:
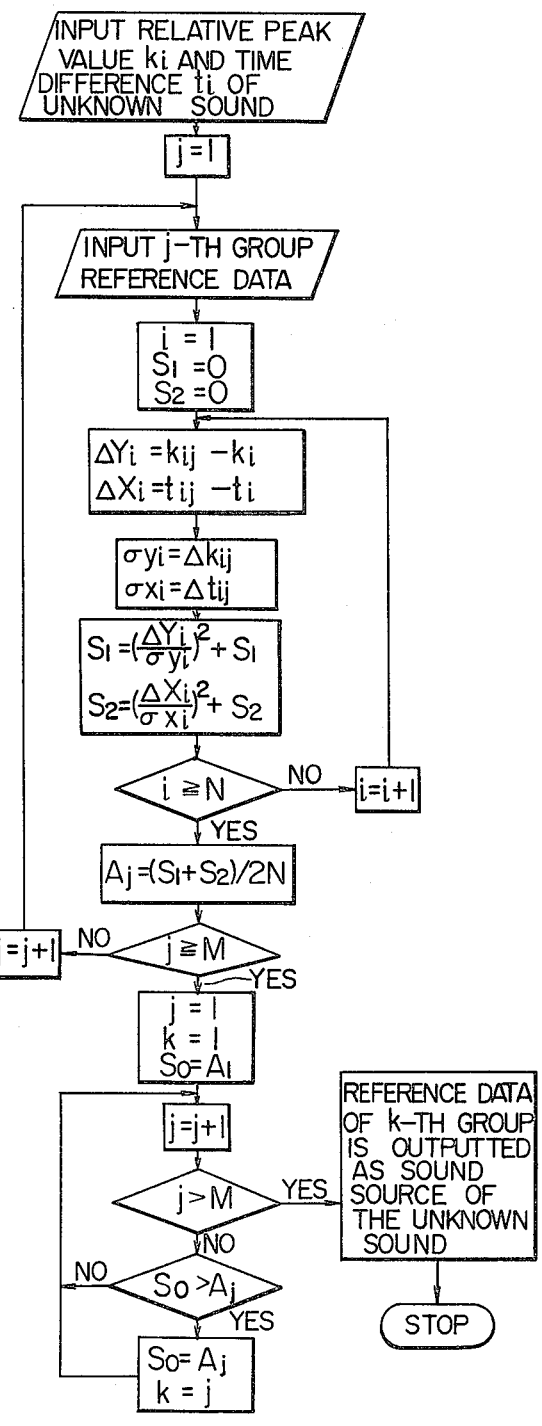
FIG. 6 is a flow chart to illustrate a sound source retrieval procedure for retrieving a pattern similar to an unknown pattern from stored reference pattern data.

The arithmetic operations corresponding to the expression (1) are effected for all the data groups, resulting in A's in number of M which are represented by $A_1$, $A_2$, ... $A_M$. Each of $A_1$, $A_2$, ..., $A_M$ represents an evaluation value statistically determined with the aid of the reference patterns. The lowest value of the M values corresponds to the location at which the sound signal is produced. In this manner, the location corresponding to the lowest value of the M values is regarded as the location at which the sound signal is produced, i.e. the position of the sound source. The sound source retrieval procedures described is illustrated in a flow chart of FIG. 6 in which reference characters represent the following items.

N: number of detectors,

M: number of reference data, $k_i$: relative peak value of unknown, sound signal from the i-th detector, and P $t_i$: time difference of the unknown sound signal from the i-th detector.

Reference data table is prepared as follows:

| First Group | | | | ... | M-th Group | | | |
|---|---|---|---|---|---|---|---|---|
| $k_{11}$ | $t_{11}$ | $\Delta k_{11}$ | $\Delta t_{11}$ | | $k_{1M}$ | $t_{1M}$ | $\Delta k_{1M}$ | $\Delta t_{1M}$ |
| . | . | . | . | | . | . | . | . |
| . | . | . | . | | . | . | . | . |
| . | . | . | . | ... | . | . | . | . |
| . | . | . | . | | . | . | . | . |
| . | . | . | . | | . | . | . | . |
| $k_{N1}$ | $t_{N1}$ | $\Delta k_{N1}$ | $\Delta t_{N1}$ | | $k_{NM}$ | $t_{NM}$ | $\Delta k_{NM}$ | $\Delta t_{NM}$ | where $k_{ij}$: relative peak value of i-th detector of j-th group, $t_{ij}$: time difference of i-th detector of j-th group, $\Delta k_{ij}$: standard deviation of the relative peak value of i-th detector of j-th group, and $\Delta t_{ij}$: standard deviation of the time difference of i-th detector of j-th group.

According to the procedure described above and illustrated in the flow chart of FIG. 6, the distances between the coordinates representative of the relative peak values and the time differences, respectively, for the individual detectors and the similarity is decided in dependence on the values A of the determined distances, wherein the values A are weighted by the standard deviations with significance being imparted to the values having greater peak values.

The pattern selected from the reference data patterns through the method of least squares described above and the pattern of the unknown signal are simultaneously displayed on the display unit DIS.

In the case of the exemplary embodiment of the invention, the mathematical expression (1) for the least squares is adopted as the evaluation function. However, the evaluating function relative to the reference pattern is not restricted to the expression (1). Further, the standard deviations are not necessarily needed. It is also possible to construct an evaluating function only in terms of the relative peak value and the time difference.

In the foregoing description, it has been assumed that the data processing is effected digitally by using a computer. However, it will be appreciated that an analog processor constructed to this end may be employed. For example, in determining the time difference, the output signal from the detector may be supplied to a comparator to thereby produce a pulse when the peak value of the input signal exceeds a preset value. In response to the pulse produced at the earliest time point in response to the output signals from the detectors, charging to a capacitor or counting of clock pulses is initiated. The charging of the capacitor or the counting of clock pulses are stopped in response to the successive pulses from the comparator to thereby produce voltages or count values proportional to the time differences for the individual detectors.

The relative peak value may be detected through cooperation of a peak-hold circuit and a divider.

It has been experimentally confirmed that, for a pressure vessel of a nuclear reactor, the method according to the invention can determine any location within the vessel at which the sound signal is produced with a practically satisfactory accuracy by using the detector in number on the order of ten.

As will be appreciated from the foregoing description, it is possible according to the invention to estimate the sound source position within a vessel or container of a complicated structure such as the pressure vessel of the nuclear reactor with the sound signal produced by a loose part being discriminated from the electric noise as well as sound signal due to mechanical noises such as notch noise of the control rods, whereby a high reliability is assured for the detection of loose parts.

We claim:

1. A method of determining a location at which a sound signal is produced in an object to be monitored in respect of generation of said sound signal, comprising steps of providing a plurality of detectors at a corresponding number of portions of said object each for detecting propagation of sound, determining relative peak values and time differences among detection signals available from said detectors, and comparing combinations of said relative peak values and said time differences with combinations of relative peak values and the time differences which are previously measured for said object, to thereby determine the location at which the sound signal is produced.

2. A method of determining the location at which a sound signal is produced in an object to be monitored in respect of generation of said sound signal, comprising the steps of providing a plurality of detectors mounted at a corresponding number of portions of said object each for detecting said sound signal transmitted through said object; determining relative peak values among detection signals obtained from said detectors; determining differences of time among detection signals obtained from said detectors; determining first combinations of said relative peak values and said time differences; and comparing said first combinations with second combinations of peak values and time differences which have been previously measured with respect to sound signals generated at selected locations on said object.

3. A method as set forth in claim 2, wherein said relative peak values and said time differences are displayed on a two-dimensional coordinate, and the location at which the sound signal is produced is determined on the basis of the displayed results.

4. A method as set forth in claim 2, wherein comparison of said detected values with the previously measured values is executed in accordance with a method of least squares weighted with standard deviations.

5. A method according to claim 4, wherein said detectors are responsive to an acceleration component of said sound signal.

6. A method according to claim 4, wherein said relative peak values are calculated by the peak values outputted from said detectors.

7. A method of determining the location at which a sound signal is produced in an object to be monitored in respect of generation of said sound signal, comprising the steps of providing a number of sound detectors at various locations on the external surface of said object for producing a plurality of detection signals in response to the generation of a sound signal in said object; combining said detection signals into a pattern in terms of the time differences of the detection signals relative to the point in time at which the respective detection signal is first produced in response to the sound signal and relative peak values of the detection signals relative to the magnitude of the detection signal produced by the detector which detects the sound signal with the highest sensitivity; and comparing the pattern thus obtained with patterns which have been previously obtained by intentionally producing sound signals at selected locations in the object, to thereby determine the location in the object at which the sound signal is produced.

8. A method as set forth in claim 7, wherein said relative peak values and said time differences are displayed on a two-dimensional coordinate, and the location at which the sound signal is produced is determined on the basis of the displayed results.

9. A method as set forth in claim 7, wherein comparison of said pattern obtained from the detection signals with the previously obtained patterns is executed in accordance with a method of least squares weighted with standard deviations.

10. A system for determining the location at which a sound signal is produced in an object to be monitored in respect of generation of said sound signal, comprising a plurality of detectors mounted at a corresponding number of portions of said object each for detecting said sound signal transmitted through said object; means for determining the relative peak values among detection signals obtained from said detectors; means for determining differences of time among detection signals obtained from said detectors; means for determining first combinations of said relative peak values and said time differences; and means for comparing said first combinations with second combinations of peak values and time differences which have been previously measured with respect to sound signals previously generated at selected locations on said object.

11. A system according to claim 10, wherein said detectors are of a type which are responsive to an acceleration component of said sound signal.

12. A system according to claim 10, wherein said comparing means includes storage means for storing said second combinations.

13. A system for determining the location at which a sound signal is produced in an object to be monitored in respect of generation of said sound signal, comprising a plurality of sound detectors positioned at various locations on the external surface of said object for producing a plurality of detection signals in response to the generation of a sound signal in said object; means for combining said detection signals into a pattern in terms of the time differences of the detection signals relative to the point in time at which the respective detection signal is first produced in response to the sound signal and relative peak values of the detection signals relative to the magnitude of the detection signal produced by the detector which detects the sound signal with the highest sensitivity; and means for comparing the pattern thus obtained with patterns which have been previously obtained by intentionally producing sound signals at selected locations in the object, to thereby determine the location in the object at which the sound signal is produced.

14. A system according to claim 13, wherein said comparing means includes means for storing said previously obtained patterns and means for comparing said stored patterns with the pattern obtained from the outputs of said detectors in accordance with the method of least squares weighted with standard deviations.

15. A system according to claim 13, wherein said detectors are of a type which are responsive to an acceleration component of said sound signal.

* * * * *